United States Patent
Saitou et al.

(10) Patent No.: US 9,769,040 B2
(45) Date of Patent: Sep. 19, 2017

(54) MONITORING APPARATUS, MONITORING METHOD AND COMPUTER READABLE MEDIUM FOR MONITORING

(75) Inventors: Naoki Saitou, Kahoku (JP); Toshitaka Kawahigashi, Kahoku (JP); Tomoharu Nakamura, Kahoku (JP)

(73) Assignee: PFU LIMITED, Kahoku-shi (JP)

(*) Notice: Subject to any disclaimer, the term of this patent is extended or adjusted under 35 U.S.C. 154(b) by 1185 days.

(21) Appl. No.: 12/964,460

(22) Filed: Dec. 9, 2010

(65) Prior Publication Data

US 2011/0258311 A1 Oct. 20, 2011

(30) Foreign Application Priority Data

Apr. 14, 2010 (JP) ................. 2010-093469

(51) Int. Cl.
*G06F 15/173* (2006.01)
*H04L 12/26* (2006.01)
*H04L 29/06* (2006.01)

(52) U.S. Cl.
CPC .......... *H04L 43/0817* (2013.01); *H04L 43/06* (2013.01); *H04L 43/08* (2013.01); *H04L 43/18* (2013.01); *H04L 63/1425* (2013.01)

(58) Field of Classification Search
CPC . H04L 43/06; H04L 43/0817; H04L 12/2602; H04L 43/08; H04L 43/18; H04L 63/1425
USPC ........................................................ 709/224
See application file for complete search history.

(56) References Cited

U.S. PATENT DOCUMENTS

| | | | | |
|---|---|---|---|---|
| 6,058,163 A * | 5/2000 | Pattison | ................... | G07C 1/10 379/133 |
| 6,577,599 B1 * | 6/2003 | Gupta et al. | ................... | 370/236 |
| 7,899,900 B1 * | 3/2011 | Motoyama | ..................... | 709/224 |
| 9,008,300 B2 * | 4/2015 | Nourbakhsh | ....... | H04M 3/5175 379/265.06 |
| 9,049,129 B2 * | 6/2015 | Saitou | ..................... | H04L 41/12 |
| 2002/0198985 A1 * | 12/2002 | Fraenkel | ............. | G06F 11/3419 709/224 |
| 2004/0068564 A1 * | 4/2004 | Snoddy et al. | ............... | 709/225 |
| 2006/0003747 A1 * | 1/2006 | Kolakowski | ............... | 455/414.1 |
| 2007/0165791 A1 * | 7/2007 | Simpson | ..................... | 379/67.1 |
| 2008/0209026 A1 * | 8/2008 | Qi et al. | ........................ | 709/223 |
| 2009/0180393 A1 * | 7/2009 | Nakamura | ..................... | 370/252 |
| 2009/0315733 A1 * | 12/2009 | Bischoff | ................ | G06Q 50/22 340/659 |

(Continued)

FOREIGN PATENT DOCUMENTS

JP 08-37526 H 2/1996
JP 11-154955 H 6/1999

(Continued)

OTHER PUBLICATIONS

Japan Office Action corresponding to JP2010-093469, mailed Sep. 27, 2013.

*Primary Examiner* — Oleg Survillo
(74) *Attorney, Agent, or Firm* — Hogan Lovells US LLP (57) ABSTRACT

There is provided a monitoring apparatus including a monitoring unit that monitors an operating situation of nodes over a network based on a predetermined monitoring parameter, a memory that records the operating situation monitored by the monitoring unit, and a changing unit that changes the monitoring parameters based on a past operating situation recorded by the memory.

1 Claim, 7 Drawing Sheets

| Apparatus ID | Protocol | Current protocol usage situation | History of past protocol usage situation | History of response time | History of retry frequency |
|---|---|---|---|---|---|
| A | HTTP | In use | ... | ... | ... |
| | FTP | Not used | H22 4/2 6:00 HTTP In use<br>FTP Not used<br>SMTP In use<br>ICMP Operating<br>...<br>H22 4/2 6:10 HTTP In use<br>FTP Not used<br>SMTP In use<br>ICMP Operating<br>... | H22 4/2 6:00 3 seconds<br>H22 4/2 6:10 2 seconds<br>... | H22 4/2 6:00 Twice<br>H22 4/2 6:10 Once<br>... |
| | SMTP | In use | | | |
| | ICMP | Operating | | | |
| B | ... | ... | ... | ... | ... |
| C | ... | ... | ... | ... | ... |
| ... | ... | ... | ... | ... | ... |

108: Monitoring result DB (56) References Cited

U.S. PATENT DOCUMENTS

| | | | |
|---|---|---|---|
| 2009/0315752 A1* | 12/2009 | Bank | G08C 17/02 341/176 |
| 2011/0102588 A1* | 5/2011 | Trundle | G08B 13/196 348/143 |
| 2011/0225295 A1* | 9/2011 | Underwood | 709/224 |
| 2012/0076001 A1* | 3/2012 | Saitou et al. | 370/241 |
| 2012/0093026 A1* | 4/2012 | Wentink | 370/253 |
| 2012/0303803 A1* | 11/2012 | DeHaas et al. | 709/224 |

FOREIGN PATENT DOCUMENTS

| | | |
|---|---|---|
| JP | 2004-86887 | 3/2004 |
| JP | 2006-148376 | 6/2006 |

\* cited by examiner

Fig. 1

1:Service monitoring system

| Apparatus ID | Monitoring interval | Timeout duration | Retry frequency | Protocol monitoring order | Monitoring time zone |
|---|---|---|---|---|---|
| A | 6:00-6:59 10 minutes<br>7:00-7:59 9 minutes<br>8:00-8:59 8 minutes<br>⋮ | 6:00-6:59 10 seconds<br>7:00-7:59 9 seconds<br>8:00-8:59 8 seconds<br>⋮ | 6:00-6:59 10 times<br>7:00-7:59 9 times<br>8:00-8:59 8 times<br>⋮ | 1.HTTP<br>2.FTP<br>3.SMTP<br>4.ICMP<br>⋮ | 6:00-23:00 |
| B | ⋮ | ⋮ | ⋮ | ⋮ | ⋮ |
| C | ⋮ | ⋮ | ⋮ | ⋮ | ⋮ |
| ⋮ | | | | | |

104: Monitoring setting DB

Fig. 4

| Apparatus ID | Protocol | Current protocol usage situation | History of past protocol usage situation | History of response time | History of retry frequency |
|---|---|---|---|---|---|
| A | HTTP | In use | ... <br> H22 4/2 6:00  HTTP In use <br>      FTP Not used <br>      SMTP In use <br>      ICMP Operating <br> ... <br> H22 4/2 6:10 HTTP In use <br>      FTP Not used <br>      SMTP In use <br>      ICMP Operating <br> ... | ... <br> H22 4/2 6:00 3 seconds <br> H22 4/2 6:10 2 seconds <br> ... | ... <br> H22 4/2 6:00 Twice <br> H22 4/2 6:10 Once <br> ... |
| | FTP | Not used | | | |
| | SMTP | In use | | | |
| | ICMP | Operating | | | |
| B | ... | ... | ... | ... | ... |
| C | ... | ... | ... | ... | ... |
| ... | ... | ... | ... | ... | ... |

108: Monitoring result DB

Fig. 5

S10: Monitoring parameter changing processing (initial time)

| Group ID | Apparatus ID | Monitoring interval | Timeout duration | Retry frequency | Protocol monitoring order | Monitoring time zone |
|---|---|---|---|---|---|---|
| G1 | A | 6:00–6:59 10 minutes<br>7:00–7:59 9 minutes<br>8:00–8:59 8 minutes<br>⋮ | 6:00–6:59 10 seconds<br>7:00–7:59 9 seconds<br>8:00–8:59 8 seconds<br>⋮ | 6:00–6:59 10 times<br>7:00–7:59 9 times<br>8:00–8:59 8 times<br>⋮ | 1.HTTP<br>2.FTP<br>3.SMTP<br>4.ICMP<br>⋮ | 6:00–23:00 |
| | B | | | | | |
| | C | | | | | |
| | ⋮ | ⋮ | ⋮ | ⋮ | ⋮ | ⋮ |
| G2 | | | | | | |
| G3 | | | | | | |
| ⋮ | | | | | | |

204: Monitoring setting DB

MONITORING APPARATUS, MONITORING METHOD AND COMPUTER READABLE MEDIUM FOR MONITORING

CROSS-REFERENCE TO RELATED APPLICATIONS

This application is based on and claims priority under 35 USC 119 from Japanese Patent Application No. 2010-093469 filed Apr. 14, 2010.

BACKGROUND OF THE INVENTION

Field of the Invention

The present invention relates to a monitoring apparatus, a monitoring method and a computer readable medium for monitoring.

SUMMARY

According to an aspect of the invention, there is provided a monitoring apparatus including a monitoring unit that monitors an operating situation of nodes over a network based on a predetermined monitoring parameter, a memory that records the operating situation monitored by the monitoring unit, and a changing unit that changes the monitoring parameters based on a past operating situation recorded by the memory.

BRIEF DESCRIPTION OF THE DRAWINGS

Exemplary embodiments of the present invention will be described in detail based on the following figures, wherein.

DETAILED DESCRIPTION

Figure 1:
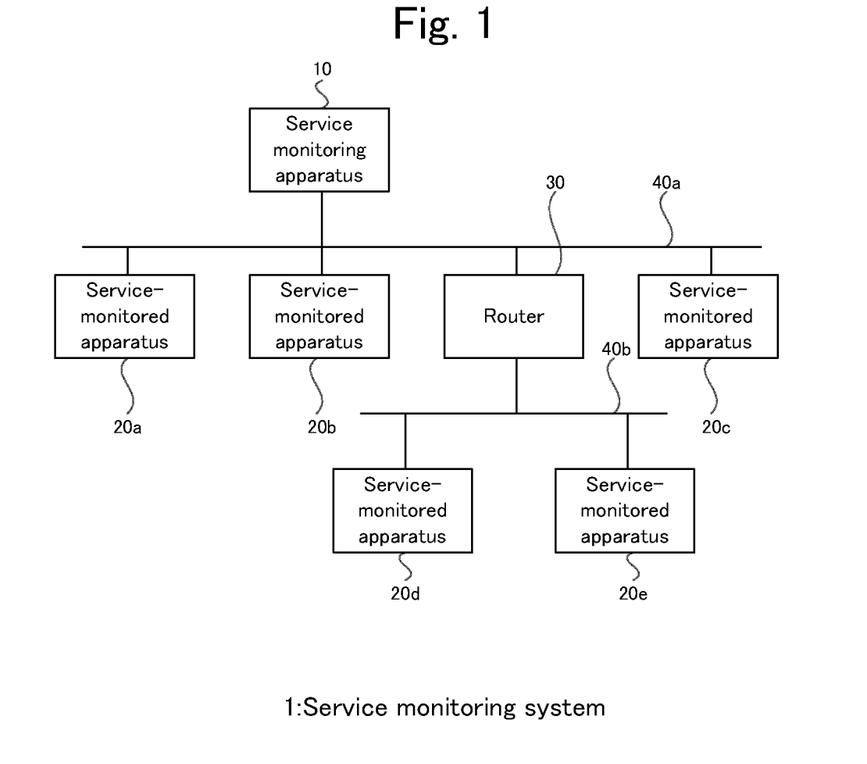
FIG. 1 is a diagram exemplifying an entire configuration of a monitoring system 1.

FIG. 1 is a diagram exemplifying an entire configuration of a monitoring system 1.

As exemplified in FIG. 1, the monitoring system 1 includes a monitoring apparatus 10 and monitored apparatuses 20 (a, b, c, d, and e). The monitoring apparatus 10 is connected to the monitored apparatuses 20a, 20b and 20c via a communication network 40a. The monitoring apparatus 10 is connected to the monitored apparatuses 20d and 20e through a router 30 over the communication network 40a and via a communication network 40b. The monitored apparatus 20 is anode over the network. The communication networks 40a and 40b are not particularly limited to the above, and may be a LAN (Local Area Network) constructed with a wired line or wireless line, for example.

Each constituent shown in the drawings will be described below.

The monitoring apparatus 10 is a computer comprising a CPU, a recording medium and the like and has a monitoring program 100, which will be described later with FIG. 2, installed therein. The monitoring apparatus 10 executes the monitoring program 100 to mainly monitor an operating situation of the monitored apparatus 20 and a usage situation of predetermined protocols in the monitored apparatus 20. The monitoring apparatus 10 changes the method for monitoring the usage situation of the protocols in the monitored apparatus 20 based on a past protocol usage situation in the monitored apparatus 20. The monitoring apparatus 10 proposes a time zone for which the operating situation of the monitored apparatus 20 and the usage situation of the protocols are monitored based on the past protocol usage situation in the monitored apparatus 20.

The monitored apparatus 20 is a device using predetermined protocols. The monitored apparatus 20 includes various network devices such as a computer, printer, scanner, storage, virtual machine, firewall, router and switching hub. The protocol includes, for example, ICMP (Internet Control Message Protocol), TCP (Transmission Control Protocol) or UDP (User Datagram Protocol). For example, the monitored apparatus 20 uses HTTP (HyperText Transfer Protocol) to exchange contents via a TCP communication port No. 80, uses FTP (File Transfer Protocol) to exchange files via TCP communication ports Nos. 20 and 21, uses SMTP (Simple Mail Transfer Protocol) to transmit e-mails via a TCP communication port No. 25, or uses DHCP (Dynamic Host Configuration Protocol) to transmit setting information necessary for network connection via a UDP No. 67.

With the configuration, the monitoring apparatus 10 monitors the operating situation of the monitored apparatuses 20 as the nodes over the network and the usage situation of the protocols via the communication network 40.

Figure 2:
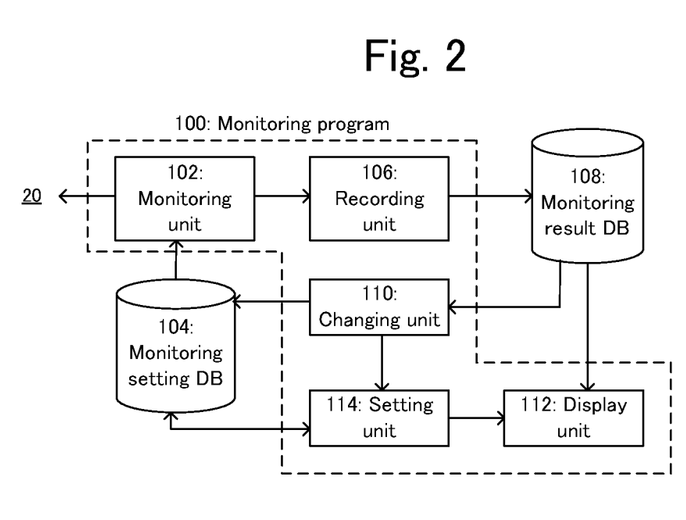
FIG. 2 is a diagram exemplifying a functional configuration of a monitoring program 100.

FIG. 2 is a diagram exemplifying a functional configuration of the monitoring program 100.

As exemplified in FIG. 2, the monitoring program 100 includes a monitoring unit 102, a recording unit 106, a changing unit 110, a display unit 112 and a setting unit 114. The monitoring program 100 reads/writes data from/into the monitoring setting database (monitoring setting DB) 104 and the monitoring result database (monitoring result DB) 108.

Part of or all the functions realized by the monitoring program 100 may be realized in hardware such as ASIC.

Each constituent shown in the drawings will be described below.

The monitoring unit 102 monitors the operating situation of the nodes over the network and the usage situation of the predetermined protocols based on predetermined monitoring parameters.

In this example, the monitoring unit 102 attempts connection establishment or data exchange according to a predetermined protocol (which will be referred to as "monitoring call" below) for the TCP or UDP communication port to be used for the predetermined protocol of the monitored apparatus 20 based on the monitoring parameters (described later with FIG. 3) stored in the monitoring setting DB 104. When connection establishment or data exchange has been made for the communication port, the monitoring unit 102 determines that the monitored apparatuses 20 utilize the predetermined protocol using the communication port. The monitoring unit 102 determines the presence/absence of the operation of the monitored apparatuses 20 depending on the presence/absence of a response to the calling for the monitoring apparatuses 20 by use of ICMP.

Figure 3:
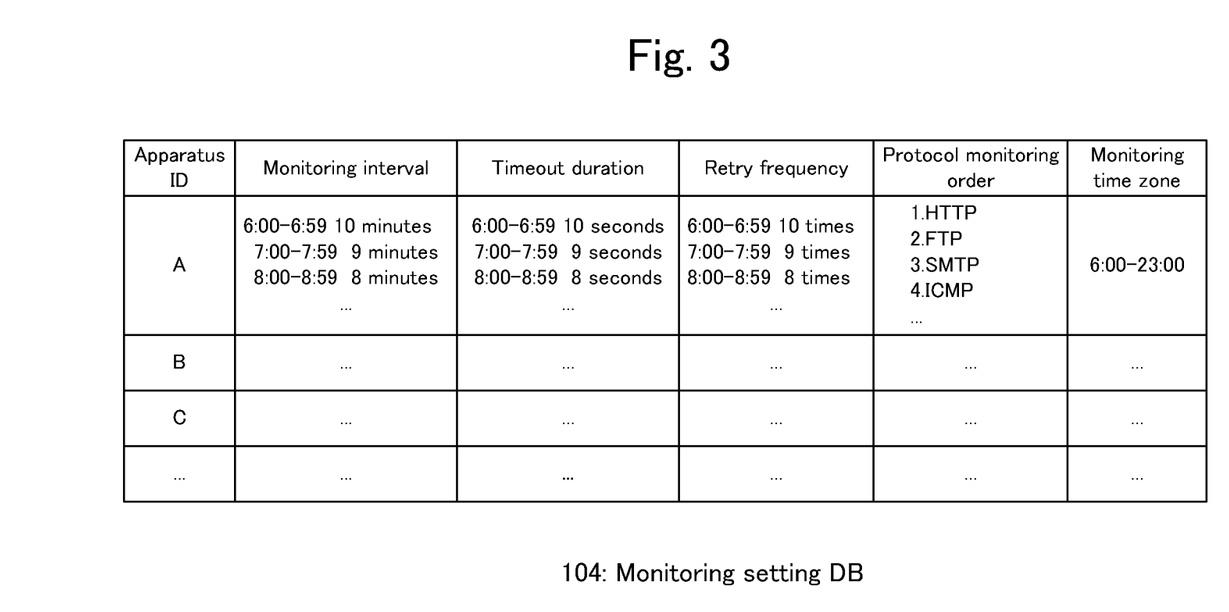
FIG. 3 is a diagram exemplifying a monitoring setting DB 104.

The monitoring setting DB 104 includes, as data items, an apparatus ID, monitoring interval, timeout duration, retry frequency, protocol monitoring order and monitoring time zone as exemplified in FIG. 3. In this example, the monitoring interval, the timeout duration, the retry frequency, the protocol monitoring order and the monitoring time zone are referred to as monitoring parameter.

Each data item shown in FIG. 3 will be described below.

The apparatus ID is identification information for specifying the monitored apparatus 20. For example, the apparatus ID is represented with a combination of character, number and symbol.

In this example, the monitoring unit 102 specifies the apparatus 20 to be monitored with reference to the apparatus ID.

The monitoring interval indicates a time interval at which the usage situation of the predetermined protocols is monitored in the monitored apparatus 20.

In this example, the monitoring unit 102 decides a time interval for each time zone, at which the usage situation of the predetermined protocols is monitored in the monitored apparatus 20 with reference to the monitoring interval.

The timeout duration is a waiting time for a response from the monitored apparatus 20 when connection establishment or data exchange is attempted according to the predetermined protocol or calling is made using ICMP on the TCP or UDP communication port used for the predetermined protocol in order to monitor the usage situation of the predetermined protocols in the monitored apparatus 20.

In this example, the monitoring unit 102 decides a waiting time for each time zone for the response from the monitored apparatus 20 with reference to the timeout duration. When no response is made from the monitored apparatus 20 after the waiting time has elapsed, the monitoring unit 102 determines that a timeout has occurred.

The retry frequency is the number of times of repetition of monitoring call when a timeout occurs in the monitoring call for the monitored apparatus 20.

In this example, the monitoring unit 102 decides the number of times of repetition of monitoring call for each time zone when a timeout occurs with reference to the retry frequency. When a response is made from the monitored apparatus 20 due to the repetition of monitoring call, the monitoring unit 102 determines that a predetermined protocol is being utilized.

The protocol monitoring order indicates a monitoring order of the usage situation of the predetermined protocols for the monitored apparatus 20.

In this example, the monitoring unit 102 sequentially monitors the usage situation of the predetermined protocols according to the protocol order indicated by the protocol monitoring order.

The monitoring time zone indicates a time zone for which the usage situation of the predetermined protocols is monitored in the monitored apparatus 20.

In this example, the monitoring unit 102 monitors the usage situation of the predetermined protocols in the monitored apparatus 20 only for the monitoring time zone.

The recording unit 106 records the operating situation of the node monitored by the monitoring unit 102 and the usage situation of the protocols.

Figure 4:
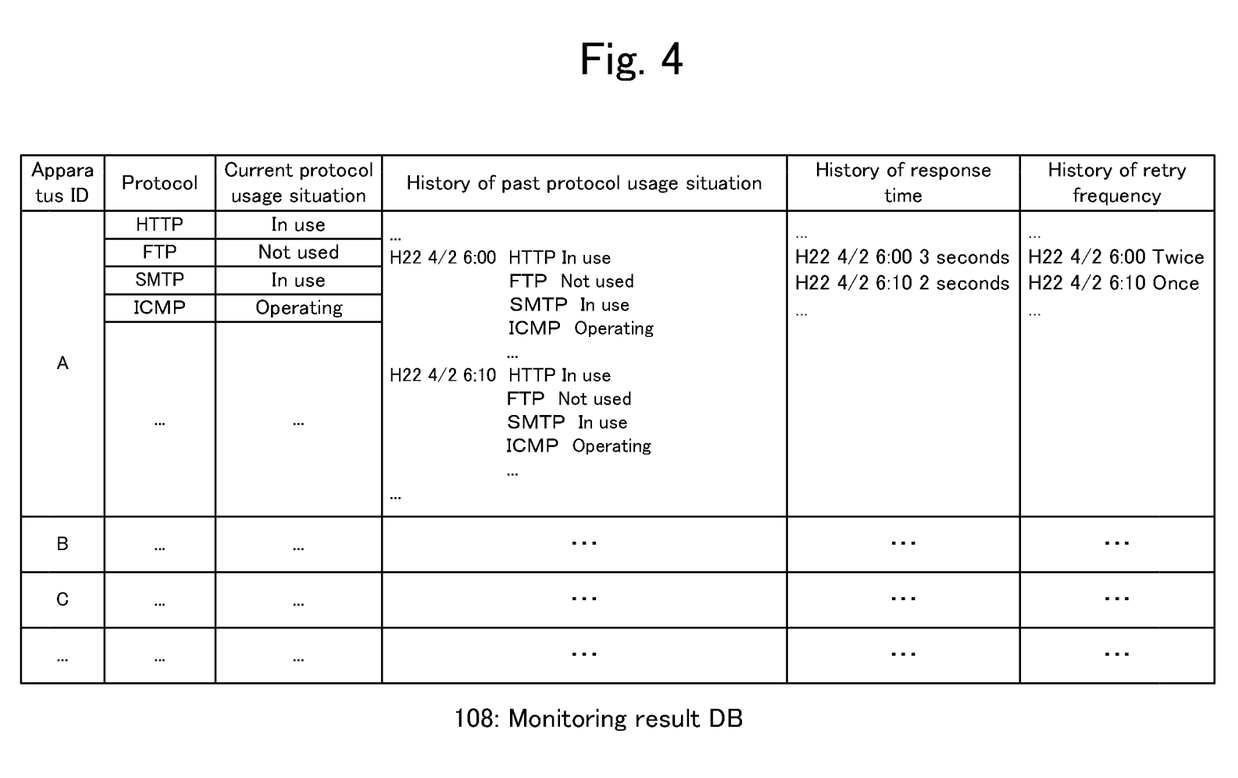
FIG. 4 is a diagram exemplifying a monitoring result DB 108.

In this example, the recording unit 106 records, in the monitoring result DB 108, a current protocol usage situation monitored and determined by the monitoring unit 102 (including the presence/absence of the operation of the monitored apparatus 20 determined with ICMP), the history of past protocol usage situation, the history of response time for monitoring call, and the history of retry frequency when a timeout occurs.

The monitoring result DB 108 includes, as data items, an apparatus ID, protocol, current protocol usage situation, history of past protocol usage situation, history of response time, and history of retry frequency. In this example, the apparatus ID, the protocol, the current protocol usage situation, the history of past protocol usage situation, the history of response time, and the history of retry frequency are referred to as monitoring result.

Each data item shown in FIG. 4 will be described below.

The apparatus ID is the same as the apparatus ID in the monitoring setting DB 104 shown in FIG. 2.

In this example, the recording unit 106 records the current protocol usage situation for each monitored apparatus 20 specified by the apparatus ID.

The protocol indicates the name of the protocol to be monitored.

In this example, the recording unit 106 records the current protocol usage situation for each protocol.

The current protocol usage situation indicates the presence/absence of past current protocol utilization in the monitored apparatus 20 determined by the monitoring unit 102.

In this example, the current protocol usage situation includes the presence/absence of the operation of the monitored apparatus 20 determined with ICMP.

The history of past protocol usage situation indicates the history of the presence/absence of past protocol utilization in the monitored apparatus 20 determined by the monitoring unit 102.

In this example, the recording unit 106 adds the pre-updated current protocol usage situation to the history of past protocol usage situation at a timing when the current protocol usage situation is updated.

The history of response time indicates the history of time which the monitored apparatus 20 requires for responding to the monitoring call made by the monitoring unit 102.

In this example, the history of response time indicates the maximum value of the time which each protocol requires to respond to the monitoring call for each monitoring time zone.

The history of retry frequency indicates the history of the number of times of repetition of monitoring call when a timeout occurs in the monitoring call made by the monitoring unit 102.

In this example, the history of retry frequency indicates the maximum value of the retry frequency which each protocol requires to respond to the monitoring call for each monitoring time zone.

The changing unit 110 changes a monitoring parameter based on a past operating situation recorded by the recording unit 106.

In this example, the changing unit 110 (one example of protocol selecting unit) changes a protocol monitoring order in the monitoring setting DB 104 based on the current protocol usage situation recorded in the monitoring result DB 108 at the initial changing of the monitoring setting DB 104 so as to preferentially monitor the protocol frequently utilized in the monitored apparatuses 20. The changing unit 110 changes the protocol monitoring order in the monitoring setting DB 104 based on the current protocol usage situation recorded in the monitoring result DB 108 so as to preferentially monitor the responded protocol at the second and subsequent changes in the monitoring setting DB 104. The changing unit 110 changes the monitoring interval in the monitoring setting DB 104 based on the history of past protocol usage situation recorded in the monitoring result DB 108 so as to widen the monitoring interval of the time zone for which a protocol was always being utilized in a past predetermined period. The changing unit 110 changes the timeout duration in the monitoring setting DB 104 to the maximum value of the response time in a past predetermined period for each time zone based on the history of response time recorded in the monitoring result DB 108. The changing unit 110 changes the retry frequency in the monitoring setting DB 104 to the maximum value of the retry frequency in a past predetermined period for each time zone based on the history of retry frequency recorded in the monitoring result DB 108.

The initial default values are set for the monitoring interval, the timeout duration and the retry frequency in the monitoring setting DB 104. The changing unit 110 changes the initial default values set in the monitoring setting DB 104 so as to be suitable monitoring parameters for each monitored apparatus 20 based on the operating situation recorded in the monitoring result DB 108.

The changing unit 110 proposes a user to exclude from the monitoring time zone a time zone for which all the protocols were not repeatedly utilized predetermined times in the past based on the operating situation recorded by the recording unit 106.

In this example, the changing unit 110 instructs the setting unit 114 to make a display for proposing the user to exclude from the monitoring time zone the time zone for which all the protocols were not repeatedly utilized predetermined times in the past based on the history of past protocol usage situation recorded in the monitoring result DB 108.

The display unit 112 displays the operating situation recoded by the recording unit 106.

In this example, the display unit 112 displays, for each apparatus ID, the current protocol usage situation, the history of past protocol operating situation, the history of response time, and the history of retry frequency, which are recorded in the monitoring result DB 108. The display unit 112 displays a setting screen for causing the user to set the monitoring setting DB 104.

The setting unit 114 receives user's input through the setting screen displayed by the display unit 112, and sets the monitoring setting DB 104 according to the received input. Typically, the monitoring parameters set in the monitoring setting DB 104 are automatically adjusted for each monitored apparatus 20 by the changing unit 110, but if the user wants to arbitrarily change the same, the setting unit 114 provides the user with a means for setting the monitoring parameters.

The setting unit 114 causes the display unit 112 to display an indication (such as character string or image) for proposing the user to exclude from the monitoring time zone the time zone for which all the protocols were not repeatedly utilized predetermined times in the past according to the instruction of the changing unit 110.

Figure 5:
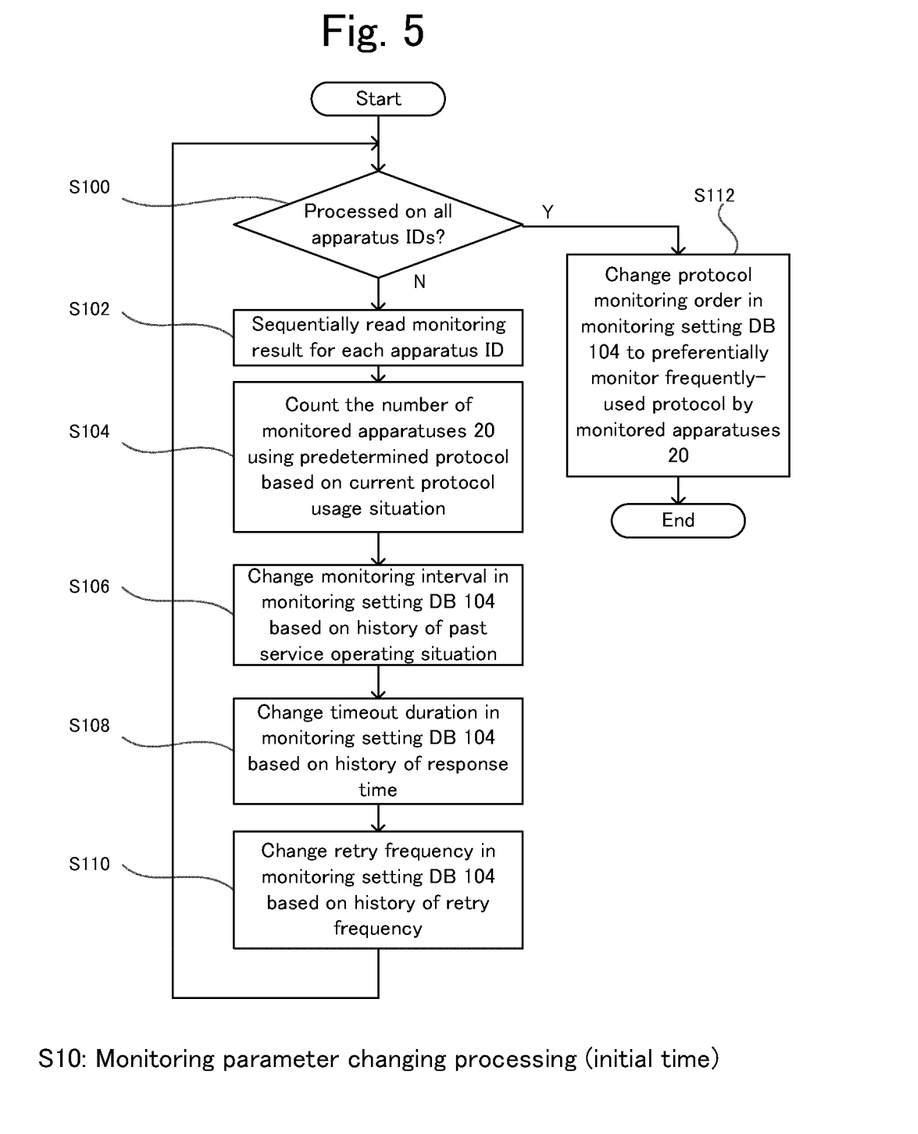
FIG. 5 is a flowchart of a monitoring parameter changing processing (at initial time) S10.

FIG. 5 is a flowchart of a monitoring parameter changing processing S10.

As exemplified in FIG. 5, in step 100 (S100), the changing unit 110 determines whether or not the processings from S102 to S110 have been performed on all the apparatus IDs in the monitoring result DB 108. When the processings have been performed on all the apparatus IDs, the monitoring program 100 terminates, and when the processings have not been performed on all the apparatus IDs, proceeds to S102.

In step 102 (S102), the changing unit 110 sequentially reads the monitoring results for each apparatus ID (such as protocol, current protocol usage situation, history of past protocol usage situation, history of response time, and history of retry frequency) from the monitoring result DB 108.

In step 104 (S104), the changing unit 110 counts the number of monitored apparatuses 20 utilizing a predetermined protocol for each protocol based on the current protocol usage situation contained in the monitoring results read in S102.

In step 106 (S106), the changing unit 110 changes the monitoring interval in the monitoring setting DB 104 to widen the monitoring interval of the time zone for which a protocol was always utilized in a past predetermined period of time based on the history of past protocol usage situation contained in the monitoring results read in S102.

In step 108 (S108), the changing unit 110 changes the timeout duration in the monitoring setting DB 104 to the maximum value of the response time in the past predetermined period of time for each time zone based on the history of response time contained in the monitoring results read in S102.

In step 110 (S110), the changing unit 110 changes the retry frequency in the monitoring setting DB 104 to the maximum value of the retry frequency in a past predetermined period of time for each time zone based on the history of retry frequency contained in the monitoring results read in S102.

In step 112 (S112), the changing unit 110 changes the protocol monitoring order in the monitored setting DB 104 based on the number of monitored apparatuses 20 counted in S104 so as to preferentially monitor the protocol frequently used in the monitored apparatuses 20. More specifically, the changing unit 110 changes the protocol monitoring order in the monitoring setting DB 104 such that the protocols more frequently used in the monitored apparatuses 20 are arranged ahead.

Figure 6:
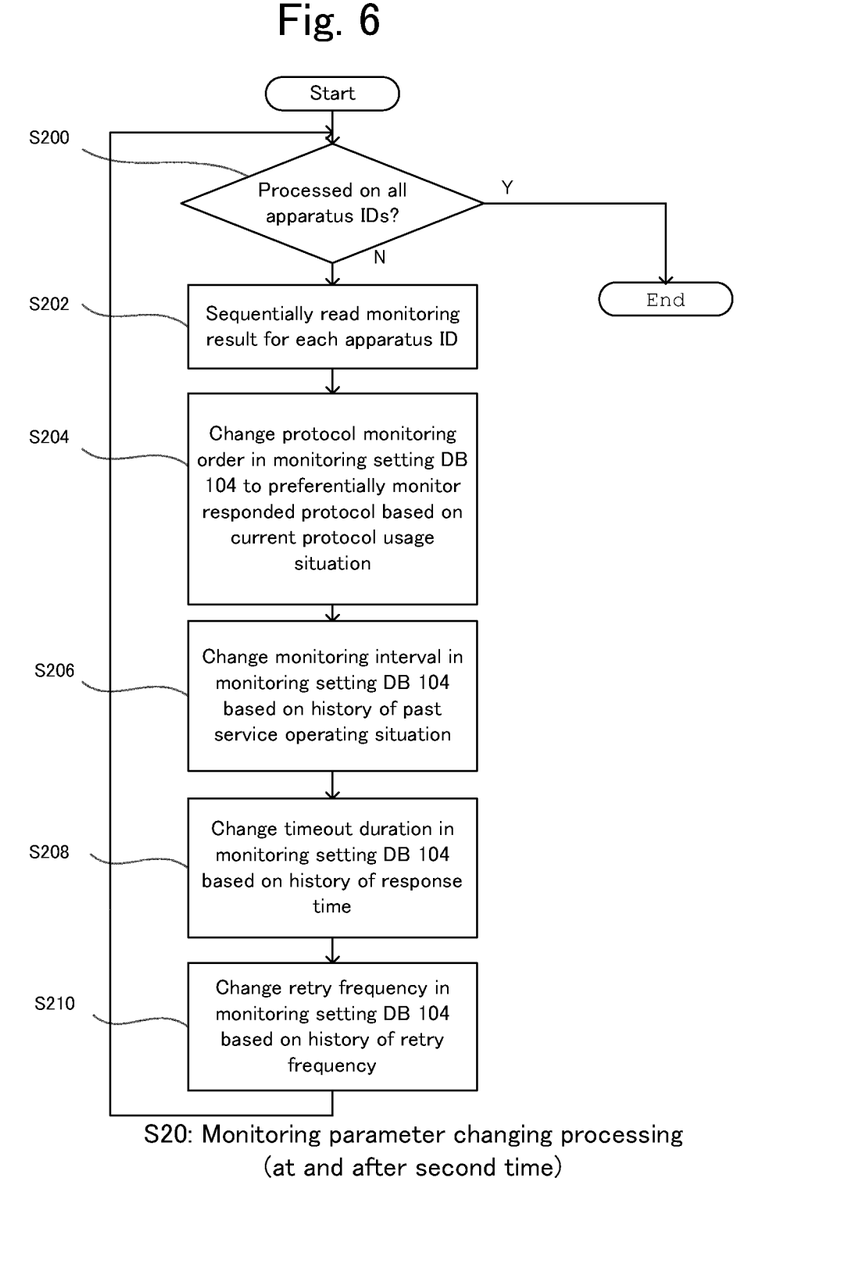
FIG. 6 is a flowchart of a monitoring parameter changing processing (at and after second time) S20.

FIG. 6 is a flowchart of a monitoring parameter changing processing (at and after second time).

As exemplified in FIG. 6, in step 200 (S200), the changing unit 110 determines whether or not the processings from S202 to S210 have been performed on all the apparatus IDs in the monitoring result DB 108. When the processings have been performed on all the apparatus IDs, the monitoring program 100 terminates, and when the processing have not been performed on all the apparatus IDs, proceeds to S202.

In step 202 (S202), the changing unit 110 sequentially reads the monitoring results for each apparatus ID (such as protocol, current protocol usage situation, history of past protocol usage situation, history of response time, and history of retry frequency) from the monitoring result DB 108.

In step 204 (S204), the changing unit 110 changes the protocol monitoring order in the monitoring setting DB 104 based on the current protocol usage situation contained in the monitoring results read in S202 so as to preferentially monitor the responded protocol. More specifically, the changing unit 110 arranges the protocol being utilized at the head of the protocol monitoring order in the monitoring setting DB 104. When multiple protocols are being used, the protocols being used may be arranged from the head of the protocol monitoring order in the monitoring setting DB 104 according to the predetermined protocol priority order.

In step 206 (S206), the changing unit 110 changes the monitoring interval in the monitoring setting DB 104 based on the history of past protocol usage situation contained in the monitoring results read in S202 so as to widen the monitoring interval of the time zone for which a protocol was always being used in a past predetermined period of time.

In step 208 (S208), the changing unit 110 changes the timeout duration in the monitoring setting DB 104 to the maximum value of the response time in a past predetermined period of time for each time zone based on the history of response time contained in the monitoring results read in S202.

In step 210 (S210), the changing unit 110 changes the retry frequency in the monitoring setting DB 104 to the maximum value of the retry frequency in a past predetermined period of time for each time zone based on the history of retry frequency contained in the monitoring results read in S202.

With the configuration, the monitoring apparatus 10 can monitor the operating situation of the monitored apparatuses 20 and the usage situation of the predetermined protocols without requesting the monitored apparatuses 20 to install a special software for monitoring or to change the setting.

Since the monitoring apparatus 10 changes the monitoring parameters depending on the operating situation of the monitored apparatuses 20 and the usage situation of the predetermined protocols, a CPU load in the monitoring apparatus 10 and a network load in the communication network 40 can be reduced, thereby efficiently monitoring the nodes.

[Variant 1]

Figure 7:
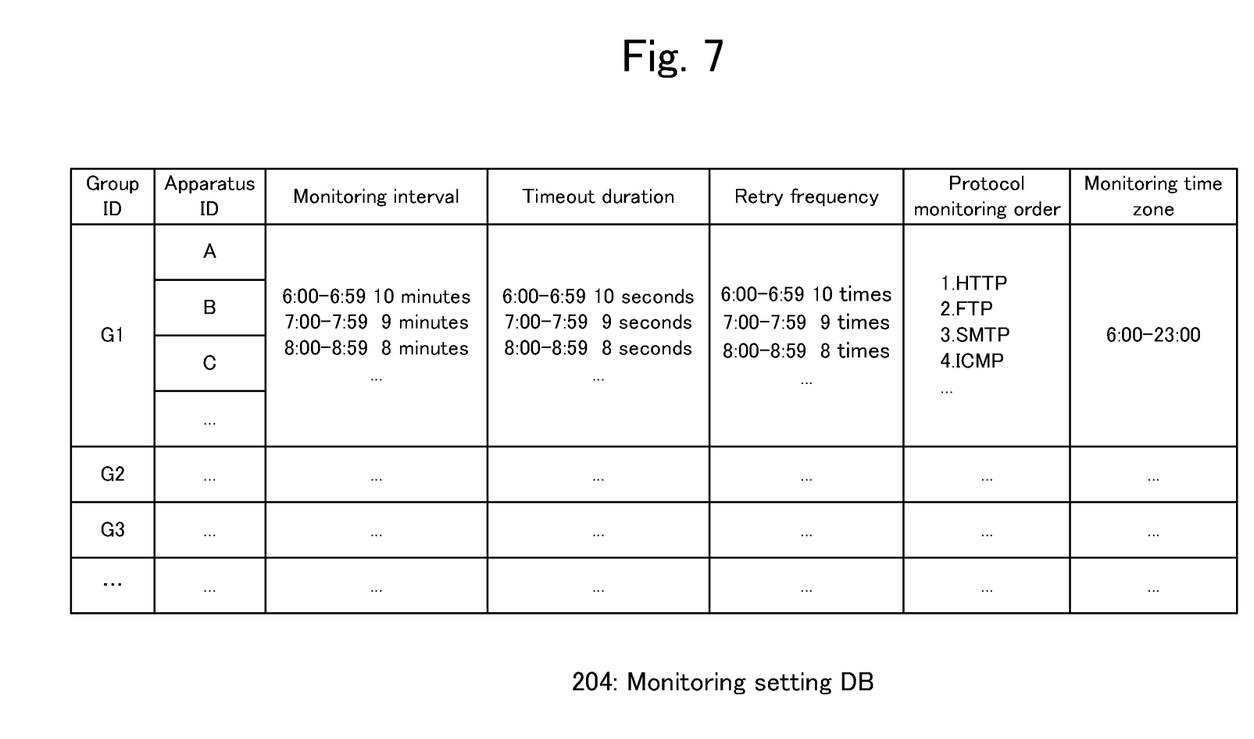
FIG. 7 is a diagram exemplifying a monitoring setting DB 204 according to Variant 1.

FIG. 7 is a diagram exemplifying a monitoring setting DB 204 according to Variant 1.

As exemplified in FIG. 7, the monitoring setting DB 204 is configured by adding a group ID as a data item to the monitoring setting DB 104 exemplified in FIG. 3.

The added group ID will be described below.

The group ID is identification information for specifying a group obtained by collecting the monitoring parameters for multiple apparatus IDs. For example, the group ID is represented by a combination of character, number and symbol.

In this example, the changing unit 110 collects the monitoring parameters as common contents and assigns a group ID to the collected monitoring parameters as a result of the change in the monitoring parameters based on the monitoring results recorded by the recording unit 106.

The setting unit 114 receives an input for causing the user to collectively change the setting of the monitoring parameters for the apparatus IDs collected by the group ID.

With the configuration, the monitoring apparatus 10 can save the storage capacity required for the monitoring setting DB 204 by collecting the monitoring parameters into one group in the monitoring setting DB 204. The user can collectively change the setting of the monitoring parameters for the apparatus ID for which the monitoring parameters are common.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A monitoring apparatus comprising:
   a monitor configured to monitor an operating situation of nodes over a network based on at least one predetermined monitoring parameter, wherein the monitor utilizes a plurality of network protocols to monitor the operating situation of the nodes, wherein the plurality of network protocols usage is monitored and wherein the at least one predetermined monitoring parameter includes at least a monitoring time period comprising a plurality of time periods during which utilization of the protocols is monitored, timeout duration for monitoring call comprising a plurality of waiting times during which a response from the monitor is established, a monitoring call retry frequency when a timeout occurs for monitoring call, and a predetermined protocol monitoring order;
   a monitoring interval, wherein the monitoring interval is the interval when a monitoring call is sent out;
   a memory configured to record the operating situation monitored by the monitor; and
   a changer configured to adjust the at least one predetermined monitoring parameter based on a past operating situation recorded by the memory;
   wherein the changer proposes a user to exclude a time period from the monitoring time period for which all the network protocols were not repeatedly used on nodes for predetermined times in the past based on the operating situation recorded by the memory; and
   wherein the changer widens the monitoring interval between monitored time periods for which a protocol was always being utilized in a past predetermined monitored period of time.

* * * * *